United States Patent
Mikula

(10) Patent No.: US 10,238,137 B2
(45) Date of Patent: Mar. 26, 2019

(54) JUICE EXTRACTOR

(71) Applicant: KONINKLIJKE PHILIPS N.V., Eindhoven (NL)

(72) Inventor: Christian Mikula, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/112,835

(22) PCT Filed: Dec. 16, 2015

(86) PCT No.: PCT/EP2015/079969
§ 371 (c)(1),
(2) Date: Jul. 20, 2016

(87) PCT Pub. No.: WO2016/107745
PCT Pub. Date: Jul. 7, 2016

(65) Prior Publication Data
US 2018/0160716 A1    Jun. 14, 2018

(30) Foreign Application Priority Data

Dec. 30, 2014  (EP) ..................................... 14200504

(51) Int. Cl.
| | |
|---|---|
| *A47J 19/02* | (2006.01) |
| *A47J 19/06* | (2006.01) |
| *A23N 1/00* | (2006.01) |
| *A23N 1/02* | (2006.01) |

(52) U.S. Cl.
CPC ............... *A23N 1/02* (2013.01); *A47J 19/02* (2013.01); *A47J 19/06* (2013.01)

(58) Field of Classification Search
CPC .......... A47J 19/02; A47J 19/022; A47J 19/06; A47J 19/027; A23N 1/00; A23N 1/02
See application file for complete search history.

(56) References Cited

U.S. PATENT DOCUMENTS

| | | | | |
|---|---|---|---|---|
| 2,204,964 A | * | 6/1940 | Koch | A47J 19/022 |
| | | | | 100/213 |
| 3,185,304 A | * | 5/1965 | Bradley | A47J 19/022 |
| | | | | 210/232 |
| 3,203,343 A | * | 8/1965 | Myers | A23N 1/003 |
| | | | | 100/213 |
| 5,156,872 A | | 10/1992 | Lee | |
| 5,452,650 A | | 9/1995 | Lee | |

(Continued)

FOREIGN PATENT DOCUMENTS

| | | |
|---|---|---|
| CN | 202015093 U | 10/2011 |
| CN | 103906454 A | 7/2014 |

(Continued)

*Primary Examiner* — Michael Laflame, Jr.

(57) ABSTRACT

A juice extractor includes a hopper, food processing chamber, and a drivetrain releasably coupled to the food processing chamber. The releasable coupling includes a lever arrangement which pivots to operate a locking member, to thereby open or close a bayonet type coupling. The locking member includes a locking wheel having a ring of notches adapted to receive projections at a mating part of the food processing chamber. Rotation of the locking wheel moves the ring of notches into and out of alignment with the projections.

11 Claims, 5 Drawing Sheets

(56) References Cited

U.S. PATENT DOCUMENTS

| | | | | |
|---|---|---|---|---|
| 5,784,954 | A | * | 7/1998 | Kokot .................... A47J 19/027 241/37.5 |
| 6,058,833 | A | * | 5/2000 | Ling ..................... A47J 19/027 241/261 |
| 2009/0064875 | A1 | | 3/2009 | Trovinger |
| 2009/0162508 | A1 | * | 6/2009 | Davies .................... A47J 19/02 426/481 |
| 2012/0103203 | A1 | * | 5/2012 | Hensel .................... A47J 19/02 99/504 |
| 2013/0206017 | A1 | * | 8/2013 | Tellez Salvador ....... A23N 1/02 99/501 |
| 2014/0238182 | A1 | | 8/2014 | Audette |

FOREIGN PATENT DOCUMENTS

| | | |
|---|---|---|
| CN | 203709785 U | 7/2014 |
| GB | 2457909 A | 9/2009 |
| KR | 20050079839 A | 8/2005 |
| WO | 0074502 A1 | 12/2000 |
| WO | 2007080571 A2 | 7/2007 |
| WO | 2012165912 A2 | 12/2012 |

\* cited by examiner

JUICE EXTRACTOR

This application is the U.S. National Phase application under 35 U.S.C. § 371 of International Application No. PCT/EP2015/079969, filed on Dec. 16, 2015, which claims the benefit of International Application No. 14200504.0 filed on Dec. 30, 2014. These applications are hereby incorporated by reference herein.

FIELD OF THE INVENTION

The present invention relates to a juice extractor comprising a food processing chamber including a food inlet, a juice outlet and a pulp outlet. A spindle extends through the food processing chamber for transporting food from the food inlet towards the pulp outlet and extracting juice from the food.

BACKGROUND OF THE INVENTION

Electric juice extractors such as horizontal macerating juicers have been used for many decades now.

An example of such a horizontal macerating juicer is for instance provided by US 2009/064875 A1. In such juice extractors, food products to be juiced are inserted into the juice extractor and the solid constituents, e.g. food fibers, sometimes referred to as pulp, is separated from the juice, with the juice and pulp being expelled from the juice extractor through separate outlets. In order to further aid the separation of the juice from the pulp, such juice extractors may further comprise a filter for capturing pulp from the juice to be expelled, which is typically placed such that the extracted juice must pass the filter before it is expelled from the juice extractor through the juice outlet.

The juicer typically has a drive motor, and a hopper through which a spindles passes, which is driven by the drive motor. The food products are supplied to an inlet of the hopper, and a pulp container collects the pulp from its respective outlet.

After use, the hopper needs to be removed from the remainder of the device, for emptying and cleaning. This involves detaching the hopper from the drive motor. A pulp container is also emptied and cleaned.

One known connection mechanism for the hopper uses a bayonet fitting between the hopper and the main motor housing. The hopper has to be pushed into place, and then twisted to lock the two parts together. This is a cumbersome operation for the user. An alternative is to use a rotating cap nut or lock ring, for instance provided by U.S. Pat. No. 5,156,872 A1. In this case, only a nut or the lock ring needs to be rotated to complete the bayonet fitting, rather than rotating the whole hopper. However, this can be a fiddly operation for a user. Furthermore, the small diameter of the nut means that a large force must be applied, which may be difficult for some users.

SUMMARY OF THE INVENTION

The present invention seeks to provide a juice extractor, for example a horizontal juice extractor, with a mechanical coupling between the hopper and the remainder of the extractor, which makes connection and disconnection easy.

According to an aspect, there is provided a juice extractor comprising:

a food processing chamber including a food inlet, a juice outlet and a pulp outlet;

a spindle extending through the food processing chamber for transporting food from the food inlet towards the pulp outlet and extracting juice from the food;

a drivetrain for rotating the spindle, wherein the drivetrain is releasably coupled to the food processing chamber, and wherein the releasable coupling between the drivetrain and the food processing chamber comprises:

a lever arrangement having a handle end and an actuator end;

a pivot shaft between the handle end and the actuator end about which the lever arrangement is rotatable;

a locking member for locking and unlocking the drivetrain from the food processing chamber, wherein the locking member is controlled by the actuator end in response to rotation of the lever arrangement;

the locking member comprising a locking wheel and the locking wheel would be rotatable about the spindle axis to implement the locking and unlocking functions; and the locking wheel comprising a ring of notches adapted to receive projections at a mating part of the food processing chamber, wherein the rotation of the locking wheel moves the ring of notches into and out of alignment with the projections. This arrangement uses a lever handle to provide actuation of a locking member. The use of a locking member avoids the need for the whole food processing chamber to be rotated to lock with the drivetrain. The lever arrangement gives mechanical advantage and also makes the release process less fiddly for the user. In particular, the operation of a lever which is pivoted at its end is more natural and requires less force than rotating a locking ring/disc.

The juice extractor may comprise a horizontal juice extractor which is adapted to be used with the spindle in a horizontal orientation.

The handle end may have a shape which matches the outer shape of a portion of the juice extractor.

For example, in a locked configuration, the handle end of the lever may be closed over the outside of the juice extractor, to give a flush or near flush outer appearance. It may sit over the surface or it may sit flush in a recess in the outer surface. To release the food processing chamber, the lever is pivoted about the pivot shaft axis to open the handle end away from the outside of the food processing chamber. This gives a clear visual indication of when the food processing chamber is locked as well as giving a pleasant aesthetic appearance in the locked position.

The pivot shaft may extend parallel to the spindle and offset from a rotation axis of the spindle. The lever thus opens radially outwardly from the spindle, giving space to easily grip the handle end of the lever arrangement.

The lever arrangement and the locking member may be attached to the drivetrain.

This arrangement means the lever arrangement can be positioned where there is more space for the user to gain access to the lever arrangement. The lever arrangement and the locking arrangement remain in place when the food processing member is released (e.g. for cleaning).

The locking wheel may be rotatable between a locked and an unlocked state with an angular movement of less than 30 degrees. This means a large mechanical advantage can be obtained by the lever, since the end opposite the handle does not need to move by a large amount.

The actuator end of the lever arrangement may comprise a gear member which engages with a corresponding outer portion of the locking member.

The gear member can be located at the pivot shaft. This gives a large mechanical advantage. Only a small movement of the gear member may be required, as the locking member may be designed so that a small movement is needed between the locked and unlocked configurations. In this case the pivot shaft may be static.

In another design, the pivot shaft comprises a first part about which the handle end is rotatable and a second part offset from the pivot axis of the first part, which second part defines the actuator end, wherein the pivot shaft rotates with the handle end.

In this way, the rotation of the handle end moves the pivot shaft, which itself defines the actuator end. This can be a two-piece design with a handle part and a bent pivot shaft which itself forms the actuator end.

The actuator end may then comprise a shaft which engages with a slot in the locking member. The rotation of the actuator end then drives the locking member.

The spindle for example comprise a helical compressing thread. This is used to compress food chunk to extract fruit juices.

The drivetrain typically comprises a motor. This provides an automatic device. It is however also possible to provide a manually operated device, in which case the drivetrain may comprise a handle for operation by a user together with any required gearing.

BRIEF DESCRIPTION OF THE DRAWINGS

Embodiments of the invention are described in more detail and by way of non-limiting examples with reference to the accompanying drawings, wherein.

DETAILED DESCRIPTION OF EMBODIMENTS

Figure 1:
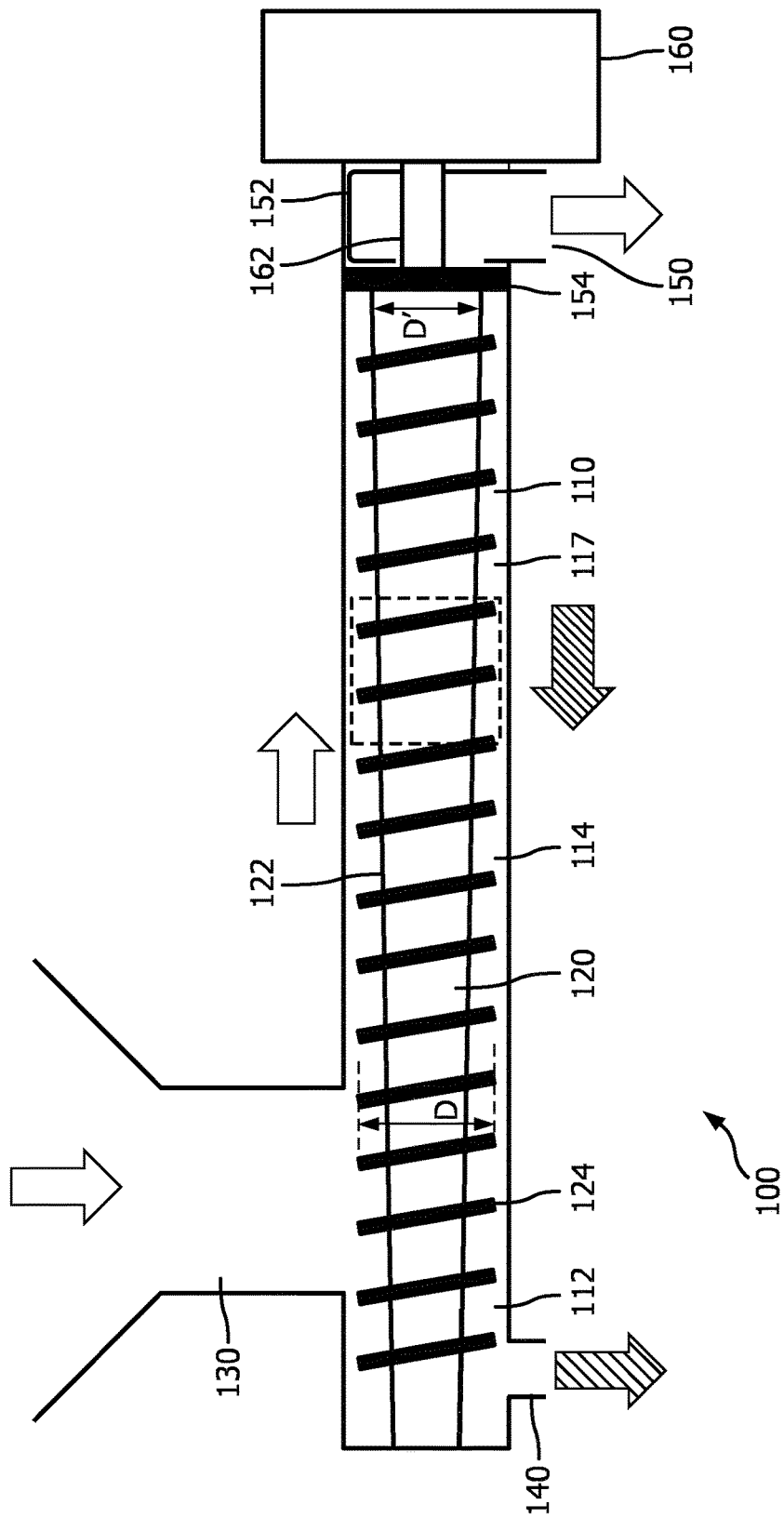
FIG. 1 schematically depicts the internal working of a horizontal juice extractor to which embodiments of the invention can be applied.

It should be understood that the Figures are merely schematic and are not drawn to scale. It should also be understood that the same reference numerals are used throughout the Figures to indicate the same or similar parts.

The invention provides a juice extractor comprising a hopper and a drivetrain releasably coupled together. The releasable coupling comprises a lever arrangement which pivots to operate a locking member, thereby to open or close a bayonet type coupling.

Where reference is made to a horizontal juice extractor, it should be understood that the term 'horizontal' refers to the predominant orientation of the spindle of the juice extractor when the juice extractor is placed on a horizontal surface. In some embodiments, the term 'horizontal' refers to the dominant component of the spindle orientation when this orientation is decomposed in a horizontal and a vertical component, i.e. to orientations in which the horizontal component of this orientation is larger than the vertical component. In some embodiments, the vertical component of this orientation is less than 40%, less than 30%, less than 20% or less than 10% of the overall orientation. In some embodiments, the vertical component is zero or near-zero.

FIG. 1 schematically depicts a horizontal juice extractor 100 to which the invention may be applied.

The horizontal juice extractor 100 may be a macerating juice extractor in at least some embodiments. The horizontal juice extractor 100 comprises a main body delimiting a food processing chamber 110 in which a spindle 120 is housed. The juice extractor 100 further comprises a drivetrain 160 including a gearbox (not shown) that is coupled to the spindle 120, for instance through a drive shaft 162, and is arranged to rotate the spindle 120 during operation of the horizontal juice extractor 100.

The food processing chamber 110 comprises a food entry section 112 that is adapted to receive food inserted into the juice extractor 100 through a food inlet 130 and a food compression section 114 in which the food is compressed to extract the juice from the food. The food inlet 130 may have any suitable shape, e.g. a funnel shape.

In at least some embodiments, the food compression section 114 cooperates with the spindle 120 to compress chunks of food that are transported by the spindle 120 from the food inlet 130 to the food compression section 114. Such compression is typically realized by gradually reducing the available volume housing the chunks of food as these chains are being transported from the food entry section 112 through the food compression section 114 towards a pulp outlet 150. This compression creates a pressure gradient of increasing pressure from the food inlet towards the pulp outlet 150. This pressure gradient forces the juice squeezed out of the chunks of food in the direction of the food inlet, where it can exit the juice extractor 100 through juice outlet 140. This for instance may be achieved by leaving a small gap 117 between the spindle 120 and the inner wall of the food compression section 114, wherein the gap 117 is dimensioned such that the extracted juice can flow through the gap towards the juice outlet 140, whilst preventing food pulp remaining on the spindle 120 from entering this gap, i.e. the small gap 117 acts as a juice channel in a bottom portion of the food processing chamber 110.

In a particularly advantageous embodiment, the juice outlet 140 is located in a bottom portion of the food processing chamber 110 such that the juice outlet 140 is located at or near a distal end of the main body relative to the drivetrain 160. This has the advantage that the horizontal juice extractor 100 produces the juice in a particularly accessible location, i.e. at its distal end, which facilitates juice collection and furthermore gives the appearance of the horizontal juice extractor 100 producing juice rather than pulp which is the case when pulp outlet is at the distal end.

The juice outlet 140 may be arranged such that the juice outlet 140 is further away from the drivetrain 160 than the food inlet 130, i.e. is closer to the distal end of the horizontal juice extractor 100. It should however be understood that the juice outlet 140 may be placed in any suitable location, i.e. the juice outlet 140 is not necessarily located near the food entry section 112.

In contrast, the pulp outlet 150 is located at a proximal end of the food processing chamber 110 relative to the drivetrain 160, i.e. in a terminal region of the food compression section 114 or a region immediately adjacent to the food compression section 114. This has the advantage that the pulp is expelled from the horizontal juice extractor 100 out of immediate view of the user of the horizontal juice extractor 100, thus further improving its appearance.

These design options are however optional, and the coupling system of the invention, described below, can be applied to all other variations.

In order to effectively extract the juice from the food pulp, the horizontal juice extractor 100 may further comprise a pulp restriction element 154, e.g. a plate or the like, which may be placed in any suitable location, such as in the food compression section 114 such that the helical spindle 120 terminates at the pulp restriction element 154. The pulp restriction element 154 typically comprises one or more apertures that cause the pulp transported by the spindle 120 to be forced through the apertures into the terminal region from which the pulp is expelled from the horizontal juice extractor 100 through the pulp outlet 150. This restriction increases the pressure exerted on the pulp, thus forcing the juice to be removed from the pulp. The removed juice may be collected in the juice channel formed by the gap 117 and transported, e.g. gravity-fed, towards the juice outlet 140, as indicated by the hashed block arrows. The terminal region may comprise a pulp deflection member 152 for deflecting the pulp towards the pulp outlet 150.

In an embodiment, the pulp deflection member 152 and the pulp restriction element 154 may form part of a single unit, which for instance reduces the number of components of the horizontal juice extractor 100 and may facilitate the cleaning process of these components.

The spindle 120 comprises a body 122 carrying a helical cutting portion 124. The helical cutting portion 124 is present on the body 122 at least in the food entry section 112 of the food processing chamber 110. The helical cutting portion 124 may extend over the whole of the spindle 120. Alternatively, the helical cutting portion 124 may cooperate with a helical food transport portion adjoining the helical cutting portion 124, wherein the helical food transport portion is arranged to transport the food chunks cut by the helical cutting portion 124 from the food entry section 112 towards and through the food compression section 114.

In at least some embodiments, the spindle 120 will have a constant outer diameter D, which is the combination of the diameter D' of the body 122 and the height by which the helical member 124 extends from the body 122. It is noted for the avoidance of doubt that the inner diameter D' and the height may not be constant; for instance, in order to aid the food compression process, the body 122 may be frustoconical body having a gradually increasing diameter D' in the direction of the pulp outlet 150 such that the height of the helical member 124 reduces at the same rate and in the same direction in order to ensure that the outer diameter D of the spindle 120 remains constant.

The helical member 124 has a pitch, i.e. the distance between neighboring turns of the helical member 124. In some embodiments, the pitch is constant over the full length of the spindle 120, i.e. throughout the food processing chamber 110. In some alternative embodiments, the pitch may be variable, e.g. decrease at least in a part of the food compression section 114 in order to aid with the compression of the food chunks inside the food compression section 114 by gradually reducing the available volume for the food chunks transported towards the pulp restriction element 154.

The above measures are measures to reduce the volume available to the food chunks by reducing the volume of the compartments defined on the spindle 120. Alternatively or additionally, the food compression section 114 of the food processing chamber 110 may have a progressively decreasing dimension, e.g. a progressively decreasing diameter, in the food transport direction, such that the gap between the spindle 120 and the inner wall(s) of the food compression section 114 is progressively reduced to reduce the volume available to the food chunks as the food chunks are being transported through the food compression section 114. For the avoidance of doubt, this embodiment may be combined with any of the embodiments in which the volume of the compartments defined on the body 122 of the spindle 120 is progressively reduced in the food transport direction through the food compression section 114.

As previously mentioned, the spindle 120 is typically arranged to transport food chunks from the food inlet 130 towards the food compression section 114 as indicated by the clear block arrows in FIG. 1.

In this example, therefore, the food chunks are transported towards the drivetrain 160. However, the food chunks may instead be driven in the opposite direction, with the pulp outlet 150 distal to the drivetrain 160, such that the spindle 120 is dimensioned to transport food chunks away from the drivetrain 160.

In at least some embodiments, the spindle 120 is made of a plastic material. This has the advantage that the spindle 120 can be manufactured cheaply, for instance by molding or casting techniques and is light-weight. This facilitates easy handling of the spindle 120, for instance when it is removed from the juice extractor 100 for cleaning purposes, e.g. for cleaning in a dishwasher.

The juicer may additionally have a filter (not shown) such that the juice extracted from the food pulp in the food compression section 114 must pass the filter in the food compression section 114.

This invention concerns in particular the connection between the food processing chamber 110 and the drivetrain 160. The food processing chamber, together with the funnel at the inlet 130 are collectively known as the hopper. One known connection mechanism uses a bayonet fitting between the hopper and the main motor housing. The hopper is pushed into place, and then twisted to lock the two parts together. Alternatively a cap nut can be used, which is rotated to complete a bayonet fitting.

Examples in accordance with the invention provide a releasable coupling between the drivetrain 160 and the food processing chamber 110 in the form of a lever arrangement, which provide easier coupling and decoupling.

Figure 2:
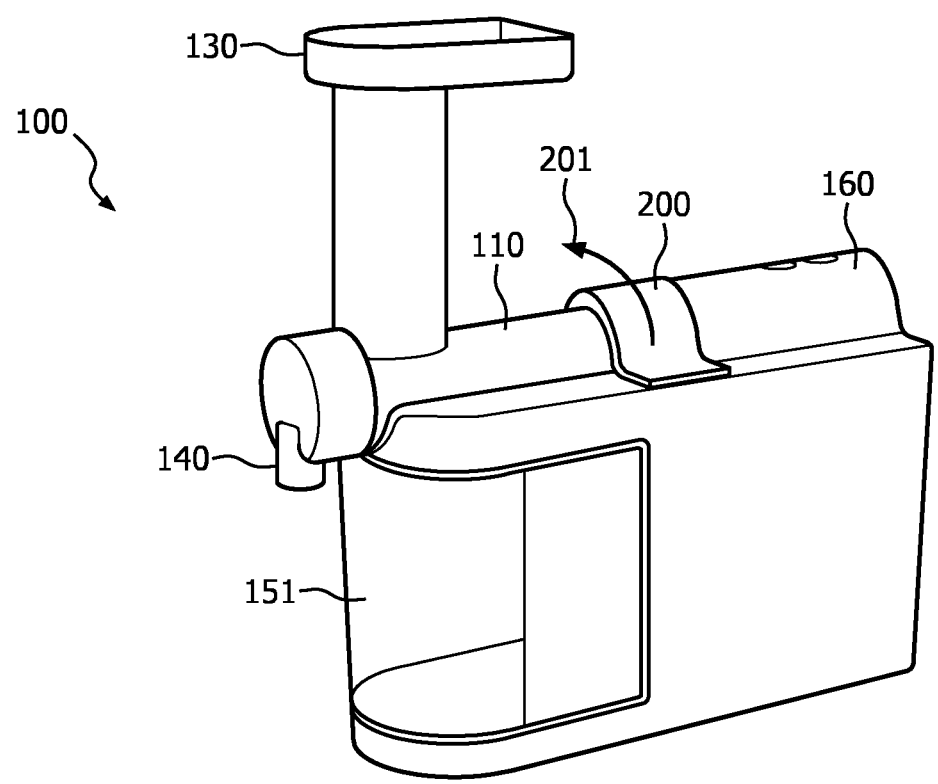
FIG. 2 show the exterior appearance of an embodiment of juice extractor.

FIG. 2 shows one example of the juice extractor 100, and shows the hopper, which comprises the food processing chamber 110 and food inlet 130 with the juice outlet 140 at the remote end. A removable pulp container 151 collects the pulp from the pulp outlet 150 (not shown in FIG. 2).

The lever arrangement is shown as 200. It is shown in FIG. 2 in a closed (i.e. locked) position. It is flush (i.e. recessed) with the outer body of the drivetrain 160, and comprises a curved lever following the outer contour of the outer body. Thus, the lever has a shape which matches the outer shape of a portion of the juice extractor. It may instead sit over a non-recessed outer surface.

The lever arrangement 200 pivots about an internal pivot axis so that the lever opens radially outwardly as shown by arrow 201. This gives a lever handle portion which can easily be gripped and manipulated.

The lever arrangement is adjacent the drivetrain 160. This means the lever arrangement is positioned where there is more space for the user to gain access to the lever arrangement.

Figure 3:
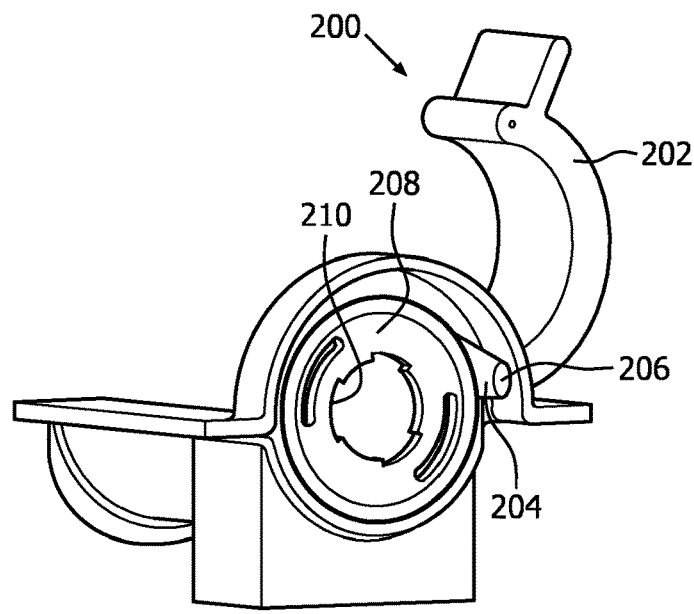
FIG. 3 shows a first design of hopper locking arrangement in the unlocked state and with no hopper attached.
Figure 4:
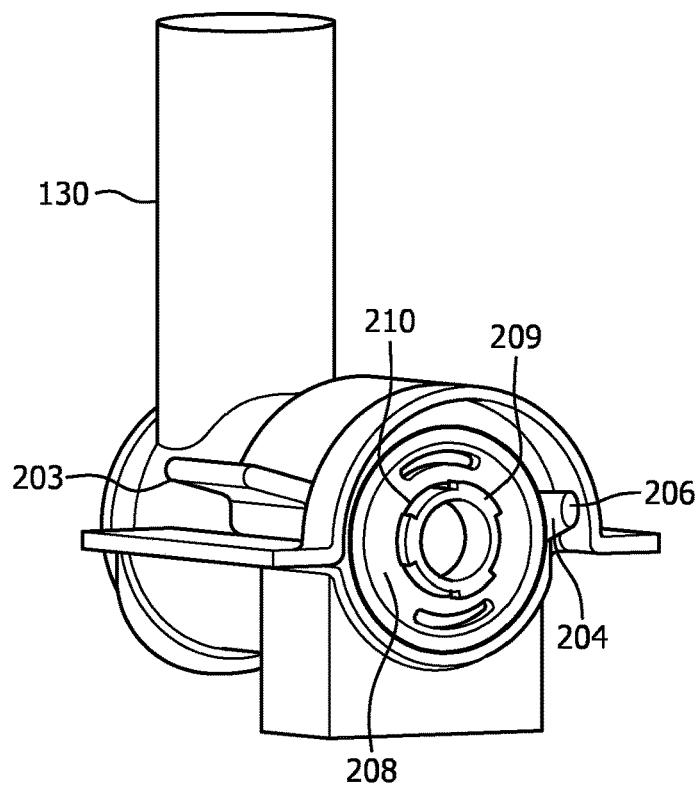
FIG. 4 shows the design of FIG. 3 in the locked state with the hopper attached.

FIGS. 3 and 4 show a first possible design for the internal components of the coupling.

The lever arrangement 200 has a handle end 202 and an actuator end 204. A pivot shaft 206 is located between the handle end 202 and the actuator end 204 about which the lever arrangement is rotatable. The pivot shaft extends parallel to the spindle rotation axis and offset from that axis. The lever thus opens radially outwardly from the spindle, giving space to easily grip the lever.

When the lever arrangement is pivoted open and closed, the actuator end 204 causes movement of a locking member 208 for locking and unlocking the drivetrain 160 from the food processing chamber. The locking member operates to perform a bayonet coupling function. Thus, when the hopper is loaded into the juicer, there are aligned hooks and notches, and when the locking member is shifted, the hooks and notches are brought out of alignment to prevent unloading.

In this example the lever arrangement 200 and the locking member 208 are part of the drivetrain 160 and they remain in place after the hopper is removed (e.g. for cleaning). However, they could be designed as part of the hopper. An advantage of having the lever on the drivetrain side is that this gives more freedom for the positioning of the lever, to make the lever operation comfortable.

The locking member shown in FIG. 3 comprises a locking wheel 208 which is rotatable about the spindle axis to implement the locking and unlocking functions. The locking wheel 208 has a ring of notches 210 which receive projections at a mating part of the food processing chamber 110. In the example shown, there are three notches spaced around the wheel 208. Once the projections have been received in the notches 210, rotation of the wheel 208 moves the notches away from the location of the projections.

FIG. 3 shows the unlocked state. By opening the handle end 202, the locking wheel 208 is rotated anticlockwise, and this defines a particular set of positions of the notches 210. FIG. 4 shows the locked state with the attached hopper and food inlet 130.

As shown in FIG. 4, the hopper has a set of three projections 209 which are designed to pass through respective notches 210. Once the projection has passed through the notch 210, the notch 210 is moved away, so that the projection is trapped behind the wheel 208, namely at the drivetrain side of the wheel 208 (i.e. in front of the wheel in with reference to the direction in which the wheel is viewed in FIGS. 3 and 4). Thus, the rotation of the locking wheel moves the ring of notches into and out of alignment with the projections.

The notches and projections may be reversed, with the locking ring 208 having hooks which rotate, and the hopper having static notches which receive the hooks.

In the example of FIGS. 3 and 4, the actuator end 204 of the lever comprises a gear member which engages with a corresponding outer portion of the locking member 208. The gear member 204 is located at the pivot shaft so that the part of the gear member 204 which drives the wheel 208 is only a small distance from the pivot axis. This gives a large mechanical advantage. Only a small movement of the gear member may be required, as the locking member may be designed so that a small movement is needed between the locked and unlocked configurations. In this case the pivot shaft may be static.

In FIG. 3 the handle part 202 is shown as recessed into the outer housing, but there is a grip part 203 which can be gripped by the user.

The gear member may engage with the outer periphery of the wheel 208 using only friction, or there may be cooperating teeth and cogs, or there may be a single projection on one side which is received in a recess on the other side. The lever in this example rotates by around 90 degrees, so that the gear member 204 also rotates by about 90 degrees. This induces rotation of the locking wheel which is sufficient to move a notch fully away from its starting position. This may require rotation of the locking wheel 208 by less than 30 degrees, for example only around 10 to 20 degrees.

This arrangement thus uses a lever handle to provide actuation of a rotatable locking member. The use of a locking member avoids the need for the whole food processing chamber to be rotated to lock with the drivetrain. The lever arrangement gives mechanical advantage and also makes the release process less fiddly for the user. In particular, the operation of a lever which is pivoted at its end is more natural and requires less force than rotating a locking ring/disc.

Figure 5:
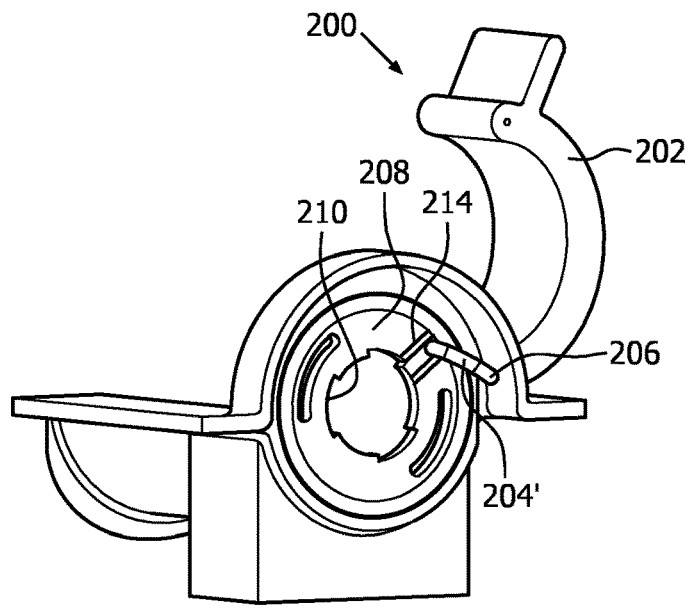
FIG. 5 shows a second design of hopper locking arrangement in the unlocked state with no hopper attached.

FIG. 5 shows a second design, in the opened state without the hopper, in which the pivot shaft 206 comprises a first part about which the handle end 202 is rotatable and a second part 204' offset from the pivot axis of the first part. The second part 204' defines the actuator end. The pivot shaft itself rotates with the handle end 202 to rotate the position of the part 204'.

The actuator end 204' is received in a slot 214 in the locking wheel 208, again to drive rotation of the locking wheel.

This can be a two-piece design with a handle part and a bent pivot shaft which itself forms the actuator end.

Figure 6:
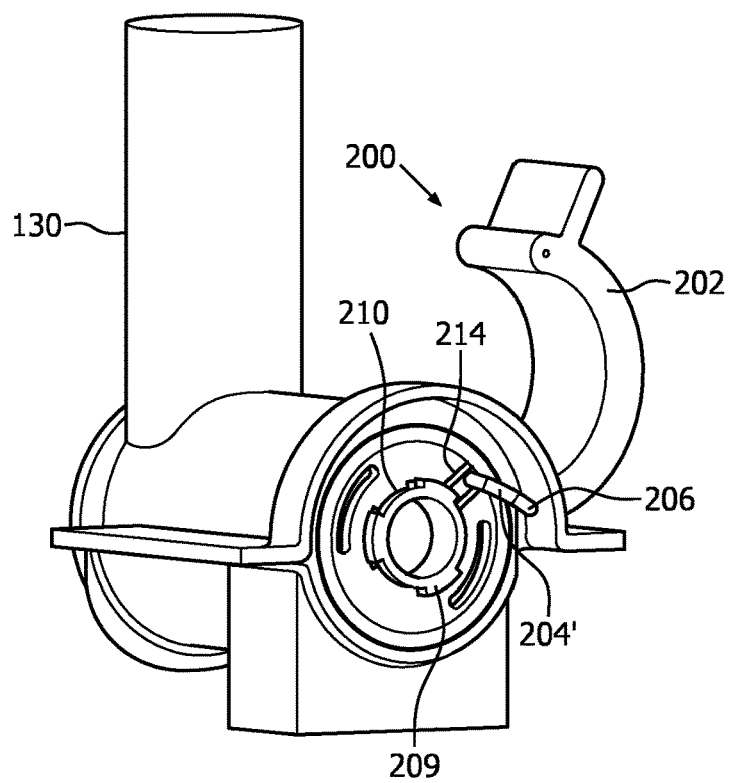
FIG. 6 shows the design of FIG. 5 in the unlocked state with the hopper attached.
Figure 7:
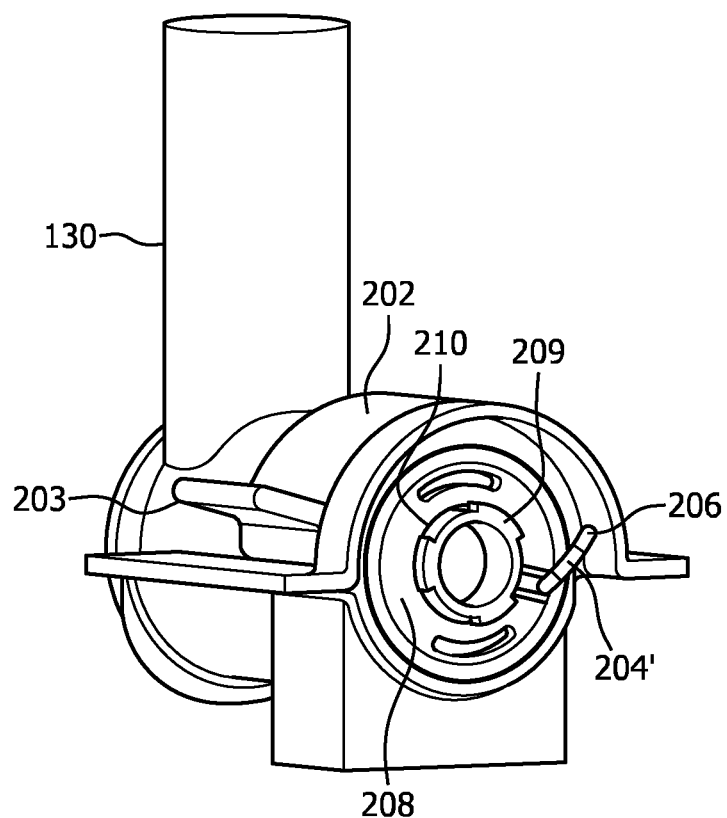
FIG. 7 shows the design of FIG. 5 in the locked state with the hopper attached.

This design functions otherwise in the same way as the design of FIGS. 3 and 4. FIG. 6 shows the design with the hopper introduced, but still in the opened state. The notches 210 are angularly aligned with the projections 209. FIG. 7 shows the design of FIG. 5 in the closed, locked configuration with the hopper attached. The notches 210 of the locking wheel 208 have been moved out of angular alignment with the projections to trap the projections behind (i.e. on the drivetrain side of) the locking wheel 208.

The drivetrain typically comprises a motor. This provides an automatic device. It is however also possible to provide a manually operated device, in which case the drivetrain may comprise a handle for operation by a user together with any required gearing.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A juice extractor comprising:
   a food processing chamber including a food inlet, a juice outlet and a pulp outlet;
   a spindle extending through the food processing chamber for transporting food from the food inlet towards the pulp outlet and extracting juice from the food;
   a drivetrain for rotating the spindle, wherein the drivetrain is releasably coupled to the food processing chamber by a releasable coupling, and wherein the releasable coupling between the drivetrain and the food processing chamber comprises:

a lever arrangement having a handle end and an actuator end;

a pivot shaft between the handle end and the actuator end about which the lever arrangement is rotatable; and a locking member for locking and unlocking the drivetrain from the food processing chamber, wherein the locking member is controlled by the actuator end in response to rotation of the lever arrangement;

the locking member comprising a locking wheel, wherein the locking wheel comprises a ring of notches adapted to receive projections at a mating part of the food processing chamber, wherein the rotation of the locking wheel moves the ring of notches into and out of alignment with the projections.

2. The juice extractor as claimed in claim 1, comprising a horizontal juice extractor which is adapted to be used with the spindle in a horizontal orientation.

3. The juice extractor as claimed in claim 1, wherein the handle end has a shape which matches an outer shape of a portion of the juice extractor.

4. The juice extractor as claimed in claim 1, wherein the pivot shaft extends parallel to the spindle and offset from a rotation axis of the spindle.

5. The juice extractor as claimed in claim 1, wherein the lever arrangement and the locking member are attached to the drivetrain.

6. The juice extractor as claimed in claim 1, wherein the locking wheel is rotatable between a locked state and an unlocked state with an angular movement of less than 30 degrees.

7. The juice extractor as claimed in claim 1, wherein the actuator end of the lever arrangement comprises a gear member which engages with a corresponding outer portion of the locking member.

8. The juice extractor as claimed in claim 1, wherein the pivot shaft comprises a first part about which the handle end is rotatable and a second part offset from the pivot axis of the first part, wherein the second part defines the actuator end, and wherein the pivot shaft rotates with the handle end.

9. The juice extractor as claimed in claim 8, wherein the actuator end comprises a shaft which engages with a slot in the locking member.

10. The juice extractor as claimed in claim 1, wherein the spindle comprises a helical compressing thread.

11. The juice extractor as claimed in claim 1, wherein the drivetrain comprises a motor.

* * * * *